(12) United States Patent
Hansen et al.

(10) Patent No.: US 7,444,134 B2
(45) Date of Patent: Oct. 28, 2008

(54) DEVICE AND METHOD FOR TRANSMITTING LONG TRAINING SEQUENCE FOR WIRELESS COMMUNICATIONS

(75) Inventors: Christopher J. Hansen, Sunnyvale, CA (US); Jason Alexander Trachewsky, Menlo Park, CA (US); Rajendra T. Moorti, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 808 days.

(21) Appl. No.: 11/056,157

(22) Filed: Feb. 14, 2005

(65) Prior Publication Data

US 2005/0180386 A1 Aug. 18, 2005

Related U.S. Application Data

(60) Provisional application No. 60/580,539, filed on Jun. 17, 2004, provisional application No. 60/568,914, filed on May 7, 2004, provisional application No. 60/545,854, filed on Feb. 19, 2004, provisional application No. 60/544,605, filed on Feb. 13, 2004.

(51) Int. Cl.
*H04Q 7/22* (2006.01)
(52) U.S. Cl. .............. 455/412.1; 455/414.1; 455/403; 455/422.1
(58) Field of Classification Search .............. 455/412.1, 455/414.1, 418, 403, 435.1, 550.1, 556.1, 455/91, 130
See application file for complete search history.

*Primary Examiner*—Tony T Nguyen
(74) *Attorney, Agent, or Firm*—Squire, Sanders & Dempsey, LLP

(57) ABSTRACT

A device and method transmits a frame of a wireless communication. The frame includes a preamble that includes a short training sequence and a long training sequence. The long training sequence includes non-zero energy on each of a plurality of subcarriers except a DC subcarrier. A frequency domain window is inserted into the long training sequence to stimulate the subcarriers for channel estimation.

23 Claims, 11 Drawing Sheets

DEVICE AND METHOD FOR TRANSMITTING LONG TRAINING SEQUENCE FOR WIRELESS COMMUNICATIONS

CROSS REFERENCE TO RELATED APPLICATIONS

This patent application claims priority under 35 USC § 119(e) to the following co-pending patent applications: U.S. Provisional Patent Application Ser. No. 60/544,605, filed Feb. 13, 2004, U.S. Provisional Patent Application Ser. No. 60/545,854, and filed on Feb. 19, 2004, U.S. Provisional Patent Application Ser. No. 60/568,914, filed on May 7, 2004, and U.S. Provisional Patent Application Ser. No. 60/580,539, filed Jun. 17, 2004.

BACKGROUND OF THE INVENTION

1. Field of the Invention

This invention relates generally to wireless communication systems and more particularly to supporting multiple wireless communication protocols within a wireless local area network using a long training sequence.

2. Description of Related Art

Wireless and wire lined communications between wireless devices and components may use networks or systems to exchange data or information. Communication systems may include national or international cellular telephone systems to the Internet to point-to-point in-home wireless networks. Communication systems and networks may operate in accordance with one or more communication protocol standards. For example, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and the like.

A wireless communication device may comply with a protocol or standard for a wireless communication system. The appropriate standard for wireless communications may vary. For instance, as the IEEE 802.11 specification has evolved from IEEE 802.11 to IEEE 802.11b (standard 11b) to IEEE 802.11a (standard 11a) and to IEEE 802.11g (standard 11g), wireless communication devices that are compliant with standard 11b may exist in the same wireless local area network (WLAN) as standard 11g compliant wireless communication devices. As another example, standard 11a compliant wireless communication devices may reside in the same WLAN as standard 11g compliant wireless communication devices.

The different standards may operate within different frequency ranges, such as 5 to 6 gigahertz (GHz) or 2.4 GHz. For example, standard 11a may operate within the higher frequency range. One aspect of standard 11a is that portions of the spectrum between 5 to 6 GHz are allocated to a channel. The channel may be 20 megahertz (MHz) wide within the frequency band. Standard 11a also may use orthogonal frequency division multiplexing (OFDM). OFDM may be implemented over subcarriers that represent lines, or values, within the frequency domain of the 20 MHz channels. A signal may be transmitted over many different subcarriers within the channel. The subcarriers are orthogonal to each other so that information may be extracted off each subcarrier about the signal.

When legacy devices reside in the same WLAN as devices compliant with later versions of the standard, a mechanism may be employed to insure that legacy devices know when the newer version devices are utilizing the wireless channel to avoid a collision. For example, backward compatibility with legacy devices may be enabled at the physical (PHY) layer, as in the case of standard 11b, or the Media-Specific Access Control (MAC) layer, as in the case of standard 11g. At the PHY layer, backward compatibility may be achieved by re-using the PHY preamble from a previous standard. In this instance, legacy devices may decode the preamble portion of all signals to provide sufficient information for determining that the wireless channel is in use for a specific period of time, thereby avoiding collisions even though the legacy devices cannot fully demodulate or decode the transmitted frame(s).

Backward compatibility with legacy devices also may be enabled by forcing devices that are compliant with a newer version of the standard to transmit special frames using modes or data rates that are employed by legacy devices. For example, the newer devices may transmit Clear to Send/Ready to Send exchange frames or Clear to Send to self frames as may be employed in standard 11g. These special frames contain information that sets the network allocation vector of legacy devices such that these devices know when the wireless channel is in use by newer stations.

These mechanisms for backward compatibility may suffer from a performance loss relative to that which can be achieved without backward compatibility and are used independently of each other. Further, in standard 11a and 11g transmitters, only 52 subcarriers (−26 ... −1 and +1 ... +26) may be filled with non-zero values even though an inverse fast Fourier transform (IFFT) of length 64 is used. As such, sharp frequency-domain transitions occur between zero subcarriers and non-zero subcarriers, which results in a time-domain ringing. Time-domain ringing may adversely affect a receiver's ability to detect a valid preamble transmission and require the receiver to perform a channel estimate using the full fast Fourier transform (FFT) size. Further, the estimation of the channels at the receiver may be compromised.

Long training may be performed for channel sounding and estimation in legacy and current systems. One action to estimate a channel may be to stimulate all the subspaces of the channel, or close to all, such as 63 out of 64 subcarriers. In a long training sequence, each of the subchannels may be stimulated with a signal to obtain a simplified least squares estimate on the receiver side. A drawback to this action may be that if you stimulate all the subcarriers, except the zero (0) subcarrier, the spectral mask requirements may not be met. If the spectral mask requirements are not met, excessive channel interference may be generated.

SUMMARY OF THE INVENTION

A method is disclosed for transmitting a preamble for a frame of a wireless communication. The method includes generating a first training sequence for a preamble of a frame. The method also includes inserting a frequency domain window into the first training sequence. The method also includes stimulating a set of subcarriers with the frequency domain window during long training.

A method also is disclosed for generating a preamble of a frame for wireless communication. The method includes receiving a training sequence for the preamble. The method also includes determining the training sequence comprises a first training sequence. The method also includes inserting a frequency domain window into the first training sequence.

A device also is disclosed for transmitting a frame in a wireless system. The device includes a signal generator to generate a preamble for a frame. The device also includes a multiplexer to insert a frequency domain window into a first training sequence within the preamble. The device also includes an IFFT module to convert the frame with the preamble to a time domain signal. The device also includes a plurality of antennas to transmit said frame.

DETAILED DESCRIPTION OF THE PREFERRED EMBODIMENTS

Reference will now be made in detail to the preferred embodiments of the present invention. Examples of the preferred embodiments are illustrated by the accompanying drawings.

Figure 1:
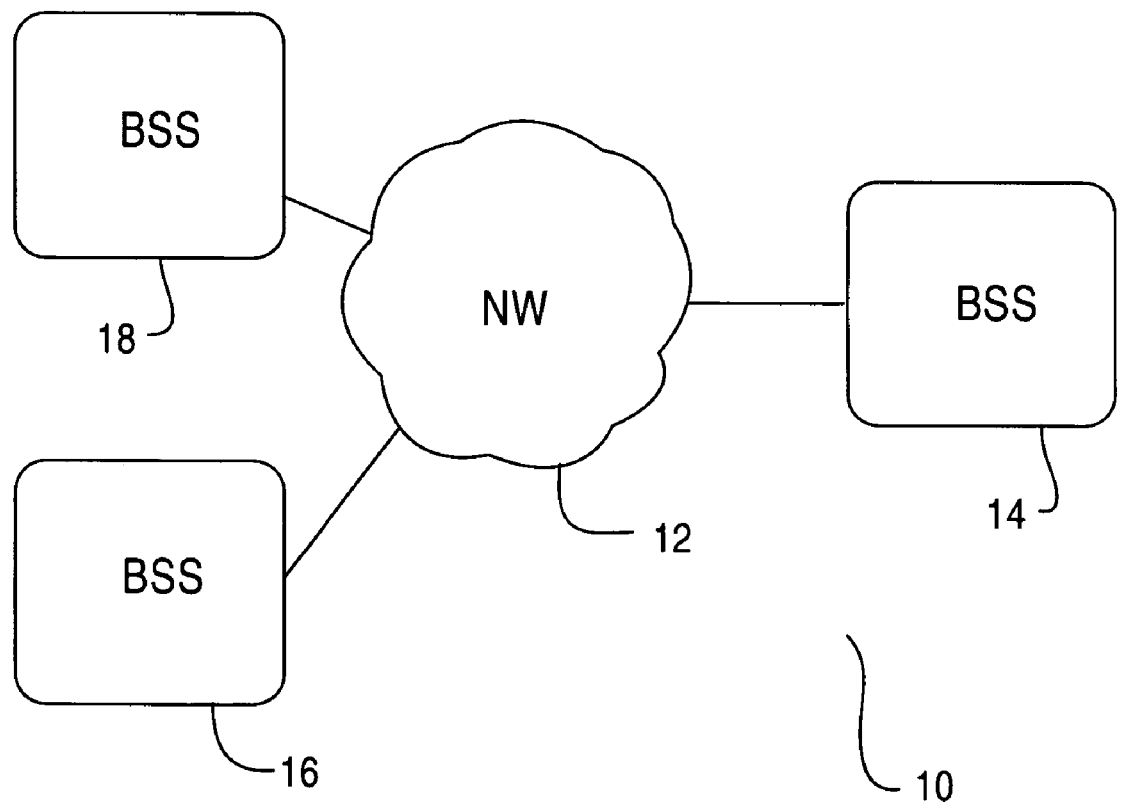
FIG. 1 illustrates a block diagram of a wireless communication system in accordance with the present invention.

FIG. 1 depicts a block diagram of a wireless communication system 10 according to the present invention. Communication system 10 may include base stations 14, 16 and 18. Base stations 14, 16 and 18 may include wireless communication devices, such as cellular or wireless phones, digital devices, laptop or desktop computers, personal digital assistants, and the like. Base stations 14, 16 and 18 may be coupled to network 12 that transmits data or information within communication system 10. Additional base stations and applicable devices or components also may be coupled to network 12 within communication system 10.

Communication system 10 may forward data or information in the form of signals, either analog or digital. Wireless devices within the individual base stations may register with the base station to receive services or communications within communication system 10. Wireless devices may exchange data or information via an allocated channel. Network 12 may set up local area networks (LANs), wide area networks (WANs), wireless local area networks (WLANs), ad-hoc networks, and the like.

Communication system 10 may operate under standard IEEE 802.11n (standard 11n) for wireless communications. Alternatively, communication system 10 may operate under a variety of standards or protocols, such as standard 11a, standard 11g and standard 11n, and include legacy devices or components. For example, certain devices or components may comply with standard 11a and newer components may comply with standard 11n. Standard 11n may occupy the 5-6 GHz band, or, alternatively, standard 11n may occupy the 2.4 GHz band. Standard 11n may be considered an extension of standard 11a. Standard 11n devices and components may operate with a throughput of 100 Mbps at the MAC. The physical layers rate for standard 11n devices and components may be greater than those of previous standards. Further, the bandwidth for channels under standard 11n may be 20 MHz or 40 MHz. Thus, standard 11n may implement wider channels than previous standards. For example, instead of 20 MHz channels, standard 11n may put two channels together as a 40 MHz channel to send twice as much data. Moreover, information may be filled into gaps between the channels due to falloff to send over twice as much data than on the two 20 MHz channels.

Multiple antennas may be used in the wireless devices and components in communication system 10. In order to operate multiple transmitters, devices within communication system 10 may have multiple receivers because several different signals may be transmitted. The number of receivers may be dependent on the number of streams of data or the number of transmitters. For example, the number of receivers within communication system 10, or any device or component thereof, may be equal to or greater than the number of data streams. Thus, communication system 10 may include, as discussed above, a multiple input, multiple output (MIMO) structure. MIMO structures may be implemented in communication system 10 to improve robustness. For improved robustness, communication system 10 may have the number of data streams be less than the number of transmitters. Thus, depending on the number of transmitters within communication system 10, the effectiveness of the transmission and reception of signals may be determined.

Various parameters may be taken into account regarding transmission channels under standard 11n, as well as previous standards. For example, the transmission channel may have certain shapes or waveforms. Data rates of the signals may be derived from the expanded bandwidth and the number of transmissions. On the receiver side, channel estimation may be achieved by using training with a signal. On the transmitter side, channel sounding may used to determine what the transmitter is supposed to send. Channel estimation may relate to what sort of signal is sent, what the signal looks like, and how the signal may be received. For example, standard 11a may implement long training sequences to provide channel estimation and sounding.

Communication system 10 may resolve the issue of taking standard 11a signals and having the signals operate within a MIMO system using multiple antennas. For example, communication system 10 may have to determine how the standard 11a signals will work within a wider channel bandwidth. Thus, communication system 10 may increase the probability of reception of signals transmitting large amounts of data. One factor may be the presumption that all of the devices and components within communication system 10 may receive all transmitted signals, no matter what format or standard is used.

Figure 2:
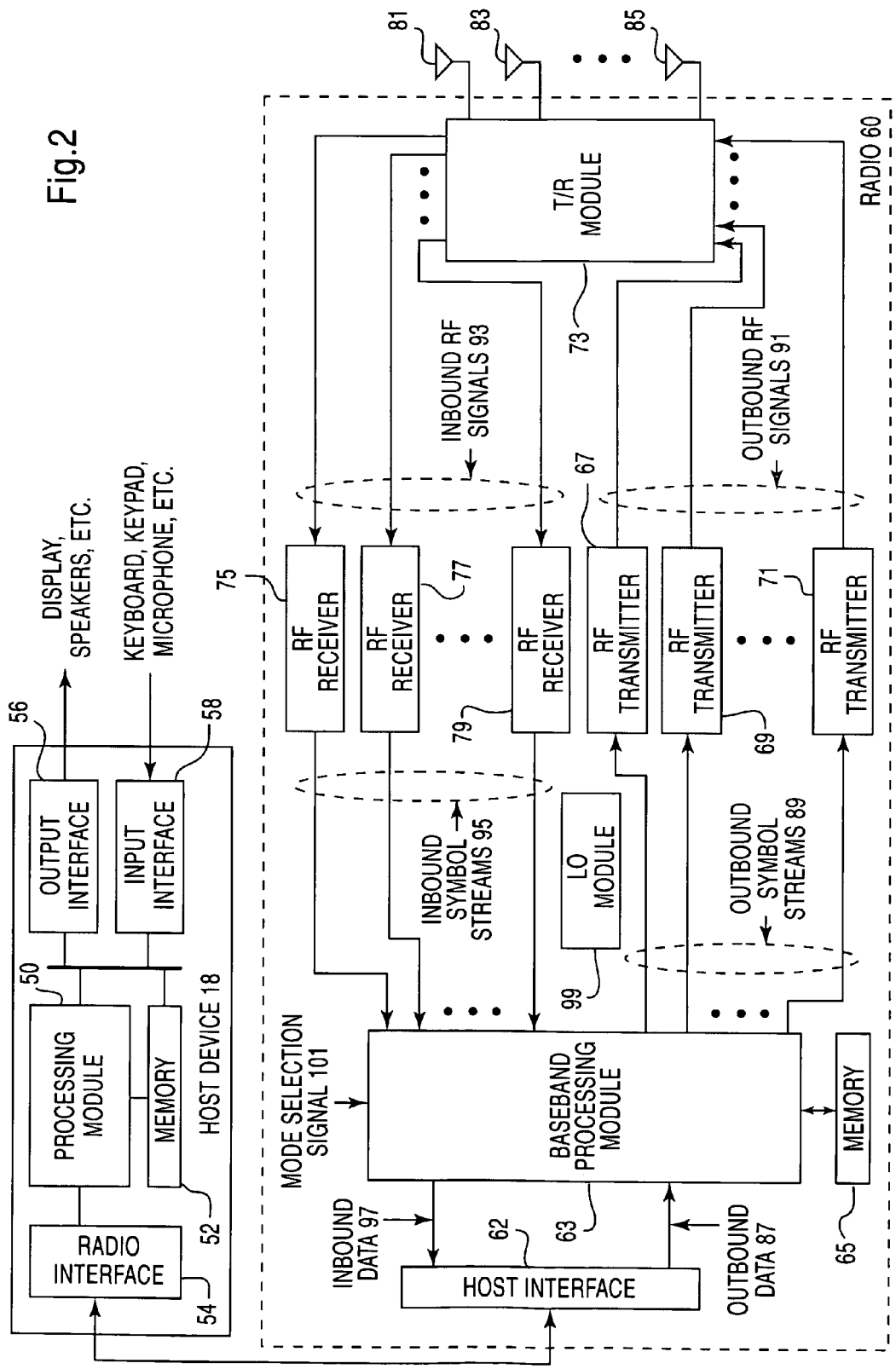
FIG. 2 illustrates a block diagram of wireless communication device in accordance with the present invention.

FIG. 2 depicts a block diagram illustrating a wireless communication device that includes host device 18 and an associated radio 60 in accordance with the present invention. Radio 60 may include a host interface 62, a baseband processing module 63, memory 65, a plurality of radio frequency (RF) transmitters 67, 69, and 71, a transmit/receive (T/R) module 73, a plurality of antennas 81, 83, and 85, a plurality of RF receivers 75, 77, and 79, and a local oscillation module 99. Baseband processing module 63, in combination with operational instructions stored in memory 65, may execute digital receiver functions and digital transmitter functions, respectively. Baseband processing modules 63 may be implemented using one or more processing devices or any device that manipulates signals (analog or digital) based on operational instructions. Memory 65 may be a single memory device or a plurality of memory devices. When processing module 63 implements one or more of its functions, memory 65, storing the corresponding operational instructions, is embedded with the circuitry comprising the state machine, analog circuitry, digital circuitry, logic circuitry and the like.

In operation, radio 60 receives outbound data 87 from host device 18 via host interface 62. Baseband processing module 63 receives outbound data 87 and, based on a mode selection signal 101, may produce one or more outbound symbol streams 89. Mode selection signal 101 may indicate a particular mode. For example, mode selection signal 101 may indicate a frequency band of 2.4 GHz, a channel bandwidth of 20 or 22 MHz and a maximum bit rate of 54 megabits-per-second. Mode selection signal 101 also may indicate a particular rate ranging from 1 megabit-per-second to 54 megabits-per-second. In addition, mode selection signal 101 may indicate a particular type of modulation, which includes, but is not limited to, Barker Code Modulation, BPSK, QPSK, CCK, 16 QAM or 64 QAM. A code rate is supplied as well as number of coded bits per subcarrier (NBPSC), coded bits per OFDM symbol (NCBPS), data bits per OFDM symbol (NDBPS), error vector magnitude in decibels (EVM), sensitivity which indicates the maximum receive power required to obtain a target packet error rate (e.g., 10% for standard 11a), adjacent channel rejection (ACR), and an alternate adjacent channel rejection (AACR).

Baseband processing module 63, based on mode selection signal 101, may produce one or more outbound symbol streams 89 from output data 88. For example, if mode selection signal 101 indicates that a single transmit antenna is being utilized for the particular mode that has been selected, baseband processing module 63 may produce a single outbound symbol stream 89. Alternatively, if mode select signal 101 indicates 2, 3 or 4 (multiple) antennas, baseband processing module 63 may produce 2, 3 or 4 (multiple) outbound symbol streams 89 corresponding to the number of antennas from output data 88.

Depending on the number of outbound streams 89 produced by baseband module 63, a corresponding number of RF transmitters 67, 69, and 71 may be enabled to convert outbound symbol streams 89 into outbound RF signals 91. Transmit/receive (T/R) module 73 receives outbound RF signals 91 and provides each outbound RF signal to a corresponding antenna 81, 83, and 85.

When radio 60 is in the receive mode, T/R module 73 receives one or more inbound RF signals via antennas 81, 83, and 85. T/R module 73 provides inbound RF signals 93 to one or more RF receivers 75, 77, and 79. RF receivers 75, 77, and 79 convert inbound RF signals 93 into a corresponding number of inbound symbol streams 96. The number of inbound symbol streams 95 may correspond to the particular mode in which the data was received. Baseband processing module 63 receives inbound symbol streams 89 and converts them into inbound data 97, which is provided to host device 18 via host interface 62.

Figure 3:
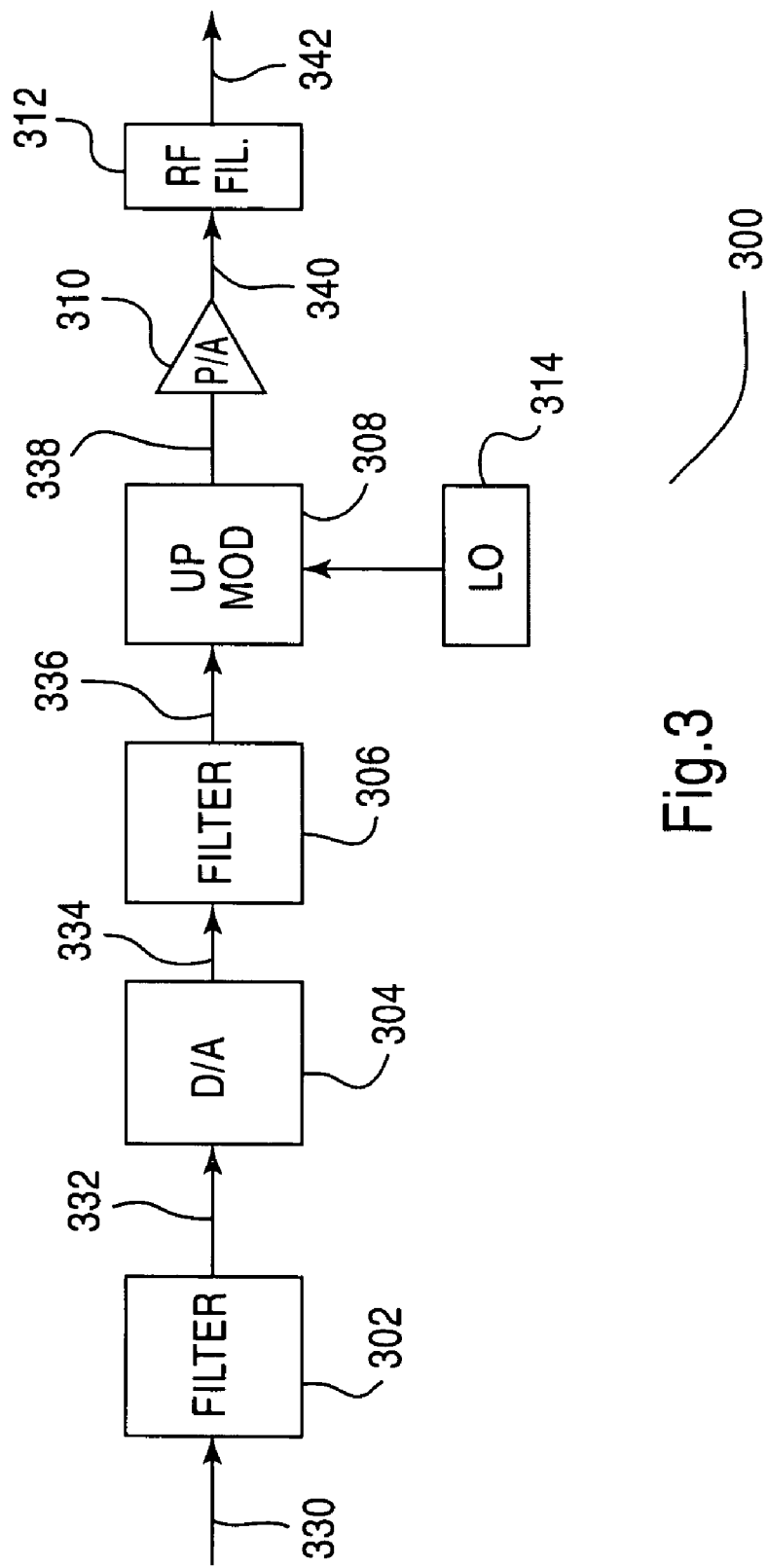
FIG. 3 illustrates a block diagram of a transmitter in accordance with the present invention.

FIG. 3 depicts a block diagram of a transmitter 300 according to the present invention. Transmitter 300 may include a filter module 302, a digital-to-analog (D/A) conversion module 304, filter 306, and up-conversion module 308. Transmitter 300 also may include amplifier 310 and RF filter 312. Filter 302 may be a digital filter that receives outbound signal streams 330 and digitally filters signals and may up-sample the rate of the symbol streams to a desired rate to produce filtered signal streams 332. Digital-to-analog conversion module 304 converts filtered signal streams 332 into analog signals 334. Analog signals 334 may include an in-phase component and a quadrature component. Filter 306 filters analog signals 334 to produce filtered analog signals 336. Filter 306 may be an analog filter.

Up-conversion module 308, which may include a pair of mixers and a filter, may mix filtered analog signals 336 with a local oscillation that is produced by local oscillation module 314 to produce high frequency signals 338. Power amplifier 310 amplifies high frequency signals 338 to produce amplified high frequency signals 340. RF filter 312, which may be a high frequency band-pass filter, filters amplified high frequency signals 340 to produce output RF signals 342.

Transmitter 300 may operate according to a variety of wireless standards and may be compatible with a variety of devices. For example, transmitter 300 may generate a signal having a preamble that indicates which standard, such as standard 11n, that the signal is meant for. Thus, the signal transmitted from transmitter 300 may pass through legacy devices or components, as well as current ones. Further, transmitter 300 may generate a number of signals and may be used in a MIMO system.

Figure 4A:
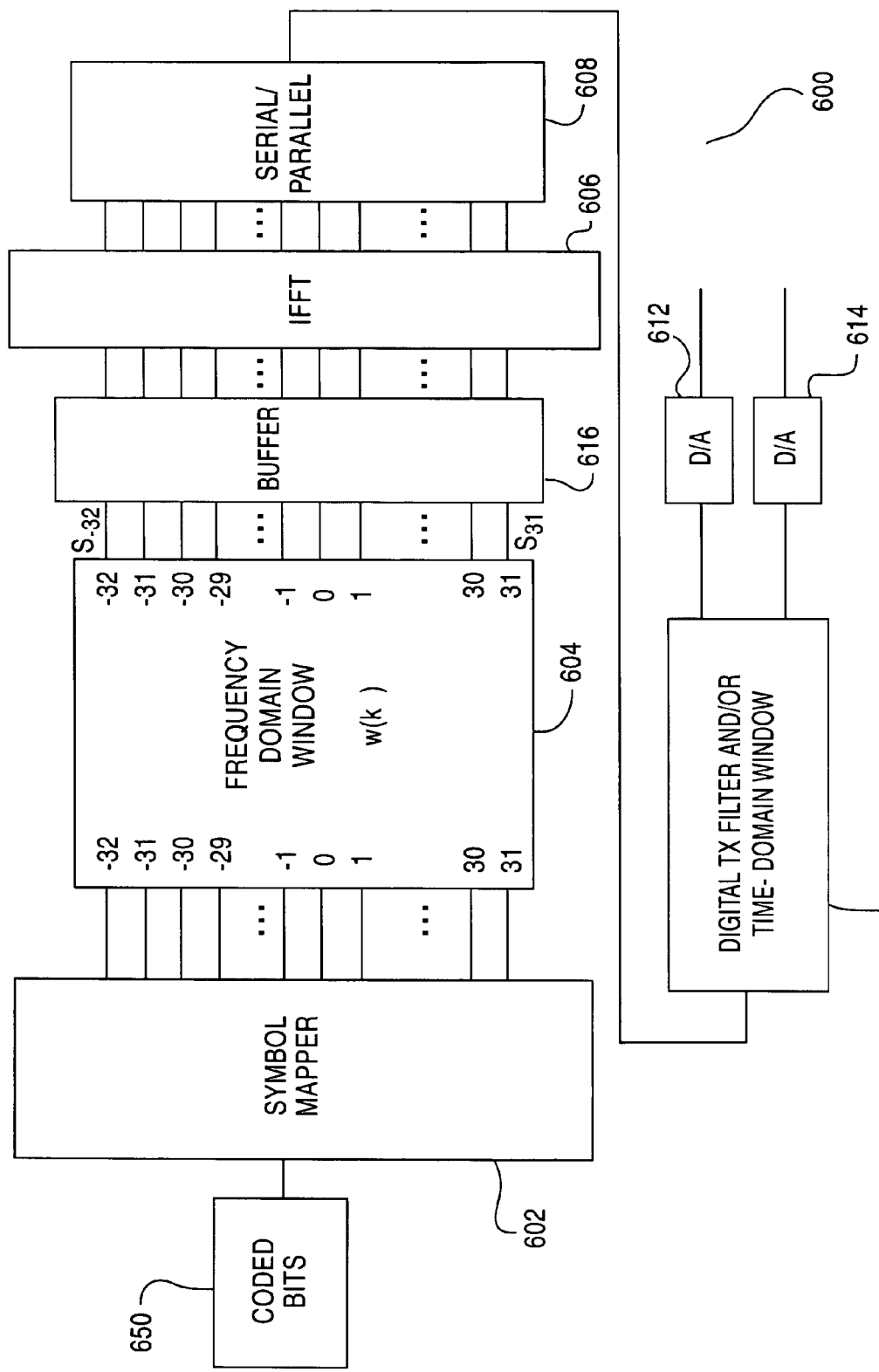
FIG. 4A illustrates a block diagram of a processor configured to generate a long training sequence in accordance with the present invention.

FIG. 4A depicts a block diagram of processor 600 configured to generate an expanded long training sequence according to the present invention. Processor 600 may correspond to the processors described above. Processor 600 may include a symbol mapper 602, a frequency domain window [w(k)] 604, an inverse fast Fourier transform (IFFT) module 606, a serial to parallel module 608, a digital transmit filter or time domain window module 610, and digital to analog (D/A) converters 612 and 614.

For an expanded long training sequence, symbol mapper 602 may generate symbols from coded bits 650 for each of the 64 subcarriers (−32 to +31) of an OFDM sequence. Frequency domain window 604 may apply a weighting factor on each subcarrier. The weighting factor, however, may not be applied to the DC, or 0, subcarrier.

Figure 4B:
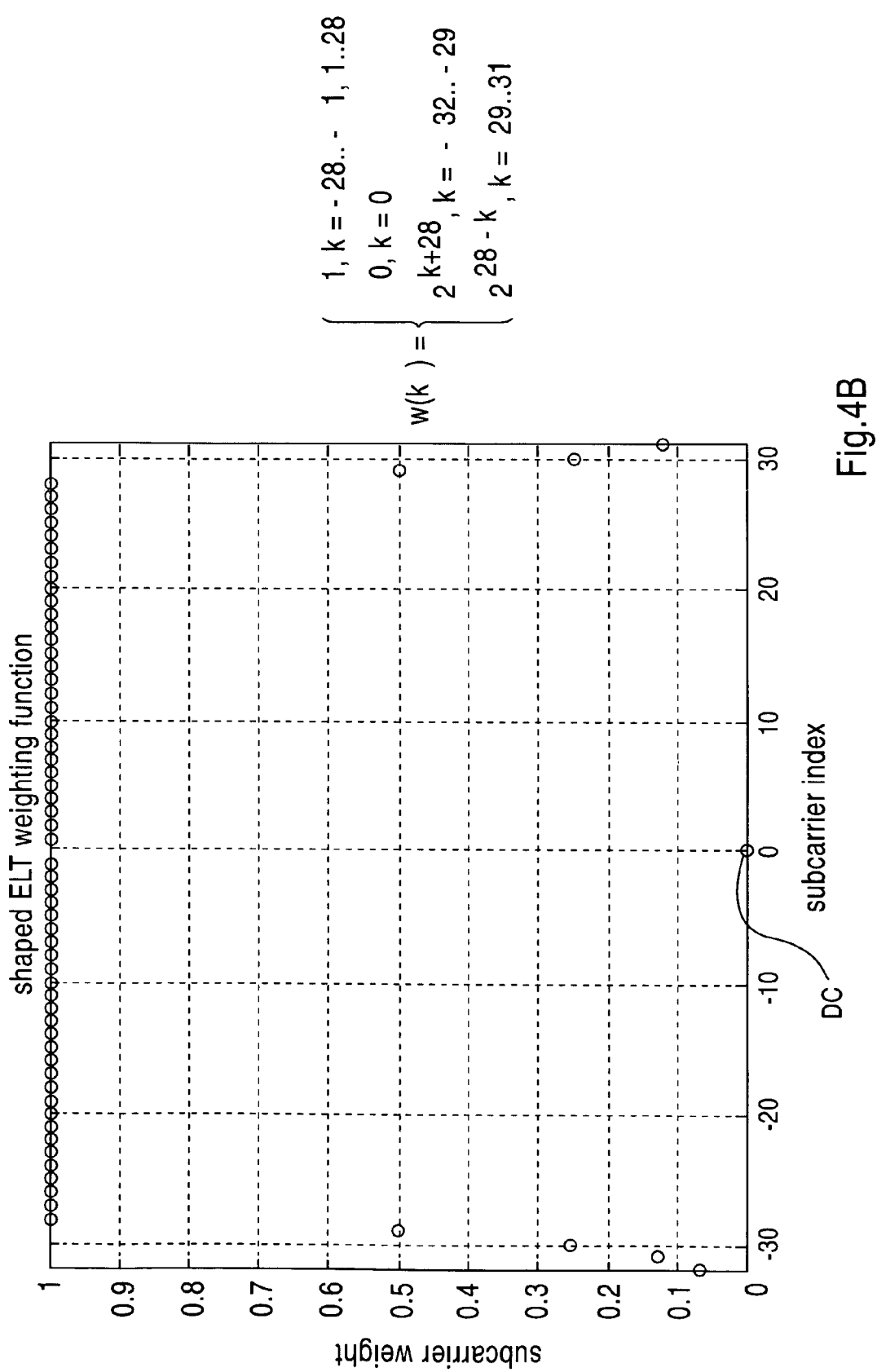
FIG. 4B illustrates a graph of preamble subcarrier weighting in accordance with the present invention.

An example of the application of the weighting factors may be shown in FIG. 4B, which illustrates a graph of preamble subcarrier weighting according to the present invention. A weighting factor, w(k), may be given that determines a weighting function. For example, the weighting factor shown in FIG. 4B provides a subcarrier weight of "1" for subcarriers −28 to −1 and +1 to +28. At 0, or the DC subcarrier, the weighting factor is set to 0, as shown in FIG. 4B. For subcarriers −32 to −29 and +29 to +31, a different weight may be given for these subcarriers. Thus, all subcarriers −32 to +31, are stimulated by some weighting function where applicable.

According to the example shown in FIG. 4B, subcarriers −26 to +26 may be applicable to current and legacy standards for wireless communications, while subcarriers −32 to −27 and +27 to +31 may be applicable to current standards. Weighting factors and weighting functions applicable to providing a frequency domain window, however, are not limited by the disclosure of FIG. 4B. Different weighting factors, functions, and applicable subcarriers may be apparent to one skilled in the art, and modifiable to a variety of wireless standards and communication networks. Referring back to FIG. 4A, IFFT module 606 may convert the subcarriers from the frequency domain to the time domain. Serial to parallel module 608 may convert the serial time domain signals into parallel time domain signals that are subsequently filtered and converted to analog signals via D/A converters 612 and 614.

Frequency domain window 604 may be inserted to stimulate all the subcarriers and to improve the performance of the long training sequence. Any window may be used, and frequency domain window 604 is not limited to the following discussion. For example, a fall off window may be used that includes an exponential fall off of a factor of 2 with every additional sample, or index. Referring to FIG. 4B, an exponential fall off window is depicted in accordance with the weighting function discussed above. According to FIG. 4B, subcarrier −29 may be ½ the subcarrier weight, along with subcarrier +29. Further, according to the example, subcarrier −30 may be ¼ the subcarrier weight, along with subcarrier +30. The subcarrier weight may reduce exponentially, or according to a certain factor as the subcarrier index is increased. The subcarrier weight for the applicable window, such as frequency domain window 604, may vary according to a desired function. For example, subcarriers −30 and +30 may be ⅓ the subcarrier weight. Thus, frequency domain window 604 may extend the long training sequence for traditional subcarriers.

Referring back to FIG. 4A, all of indices −32 to +31 may be stimulated by frequency domain window 604. For example, the outer subcarriers may be attenuated by frequency domain window 604. The complexity of applicable filter 610 may be reduced by using frequency domain window 604. These filters also may be included in D/A converters 612 and 614. Alternatively, these filters may be included in digital transmitter window or time domain window 610. Further, buffer 616 may be coupled between frequency domain window 604 and IFFT module 606. The windowing function scales the input of the IFFT within IFFT module 606 to reduce peak to average ratio. Thus, additional subcarriers may be stimulated to provide a better estimate of channels while meeting the spectral mask frequency requirements.

As an example, the following sequence may be passed through IFFT module 606 to obtain a low peak to average ratio:

$s_{-32} \ldots s_{-17} = \{-1,-1,-1,1,-1,-1,1,1,-1,-1,1,1,-1,1,-1,1\}$
$s_{-16} \ldots s_{-1} = \{1,1,1,1,1,-1,-1,1,1,-1,1,-1,1,1,1,1\}$
$s_0 \ldots s_{15} = \{0,1,-1,-1,1,1,-1,1,-1,1,-1,-1,-1,-1,-1,1\}$
$s_{16} \ldots s_{31} = \{1,-1,-1,1,-1,1,-1,1,1,1,1,-1,-1,-1,1,-1\}$.

As shown in the example, a subset of subcarriers −32 to +31 may be stimulated or excited by frequency domain window 604. Thus, in accordance with a current standard, additional subcarriers are stimulated in comparison to legacy standards. The legacy standards may not stimulate or excite all the subcarriers within this subset. Thus, channel estimation for these outer subcarriers and channels may be compromised. Further, subcarriers −32 to −26 and +26 to +31 also are excited in the example. Frequency domain window 604 stimulates or excites 63 of the 64 subcarriers using OFDM communication, and its applicable standard, such as standard 11n.

Figure 5:
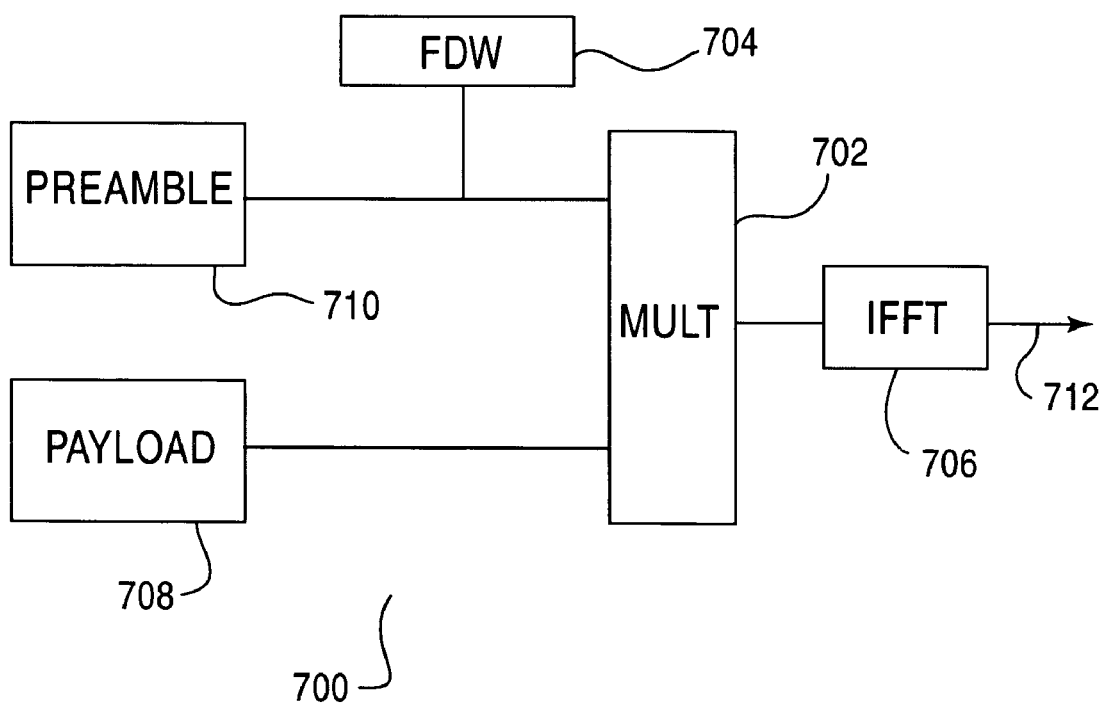
FIG. 5 illustrates a block diagram of the transmit baseband processing of a frame in accordance with the present invention.

FIG. 5 depicts a block diagram of processor 700 in a device that expands the weighting of the subcarriers used to convey information according to the present invention. Processor 700 may include a multiplexer 702 coupled between frequency domain window 704 and IFFT module 706. IFFT module 706 may output time domain signals, which include the converted portions of preamble 710 and payload 708. When an expanded long training sequence is being generated, multiplexer 702 may be enabled to insert frequency domain window 704 into preamble 710 of a signal or frame 706 for processing.

For a payload, or the data section, of a frame, such as the short training sequence, a conventional long training sequence, a signal field, and the like, multiplexer 702 may pass payload 708, or the non-expanded preamble sections, to IFFT module 706 for processing. Frequency domain window 704 may not be inserted into payload 708, or at least not into any data sections within a frame or signal. Frequency domain window 704, however, may be used to expand preamble 710, or other portions of the preamble including the signal field and multiple long training sequences.

Thus, frequency domain window 704 may be added to a long training sequence to excite all the subcarriers within a channel, as described above. The long training sequence also may be referred to as the first training sequence. All subcarriers, with the exception of 0, may be excited, even out to −32 or +31 subcarriers. Frequency domain window 704 may be added after the long training sequence has been generated for transmitting. Subcarriers are added out to −32 and +31, while the spectral mask frequency requirements are relaxed. Further, processor 700 may be compatible with a standard 11a sequence from legacy devices or components. Thus, preamble symbols may have the outer tones chosen so to minimize the peak to average ratio, and channel estimation may be improved by filling the whole FFT space during the long training sequence. The long training sequence is applicable because the additional subchannels may be estimated.

Figure 6:
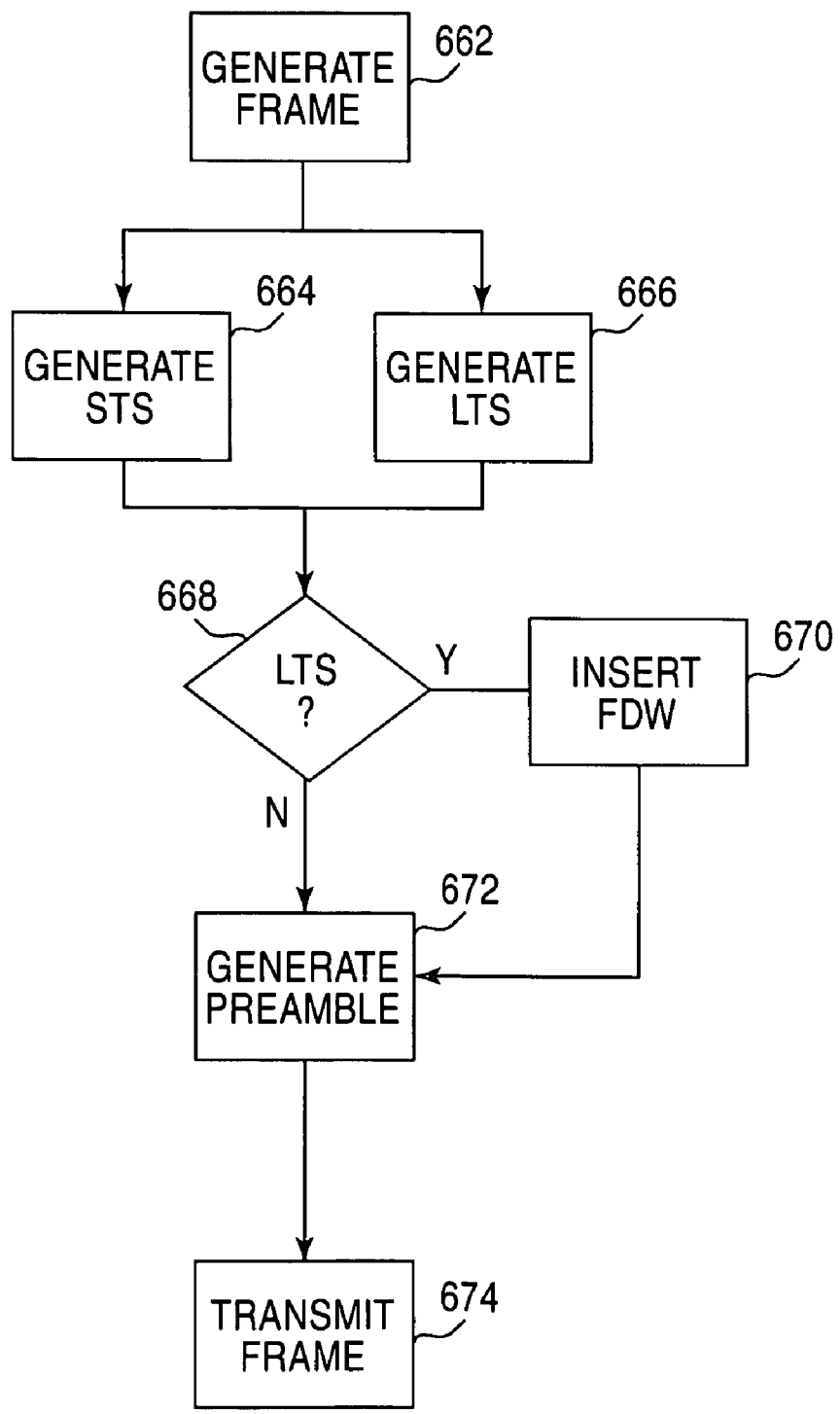
FIG. 6 illustrates a flow chart for transmitting a frame in accordance with the present invention.

FIG. 6 depicts a flowchart of a process for transmitting a frame having a preamble according to the present invention. The steps described in FIG. 6 may pertain to the systems, devices and other embodiments shown by FIGS. 1-5. FIGS. 1-5, however, are not limited to the process shown by FIG. 6.

Step 662 executes by generating a frame to transmit, or receiving an indication to generate the frame. The frame may be converted to a time domain signal prior to transmission. Step 664 executes by generating a short training sequence to be inserted into the preamble for the frame. Step 666 executes by generating a long training sequence also to be inserted into the preamble. The short training sequence may pertain to legacy devices, or components, while the long training sequence may pertain to a current or updated standard. The short training sequence may be referred to as the second training sequence. Both training sequences may stimulate or excite subcarriers for a channel.

Step 668 executes by determining whether a received sequence, field, and the like, to be placed in the preamble is a long training sequence. If yes, then step 670 executes by inserting or adding a frequency domain window into the long training sequence. Thus, an extended long training sequence may be generated to stimulate all the subcarriers within a wide channel of a current wireless standard, such as, for example, standard 11n.

If step 668 is no, then step 672 executes by generating the preamble for the frame, including the short and long training sequences. Other fields, portions or information also may be included in the preamble. Step 674 executes by transmitting the frame with the preamble. The frame may be transmitted in a MIMO environment, with or without legacy devices or components.

Figure 7:
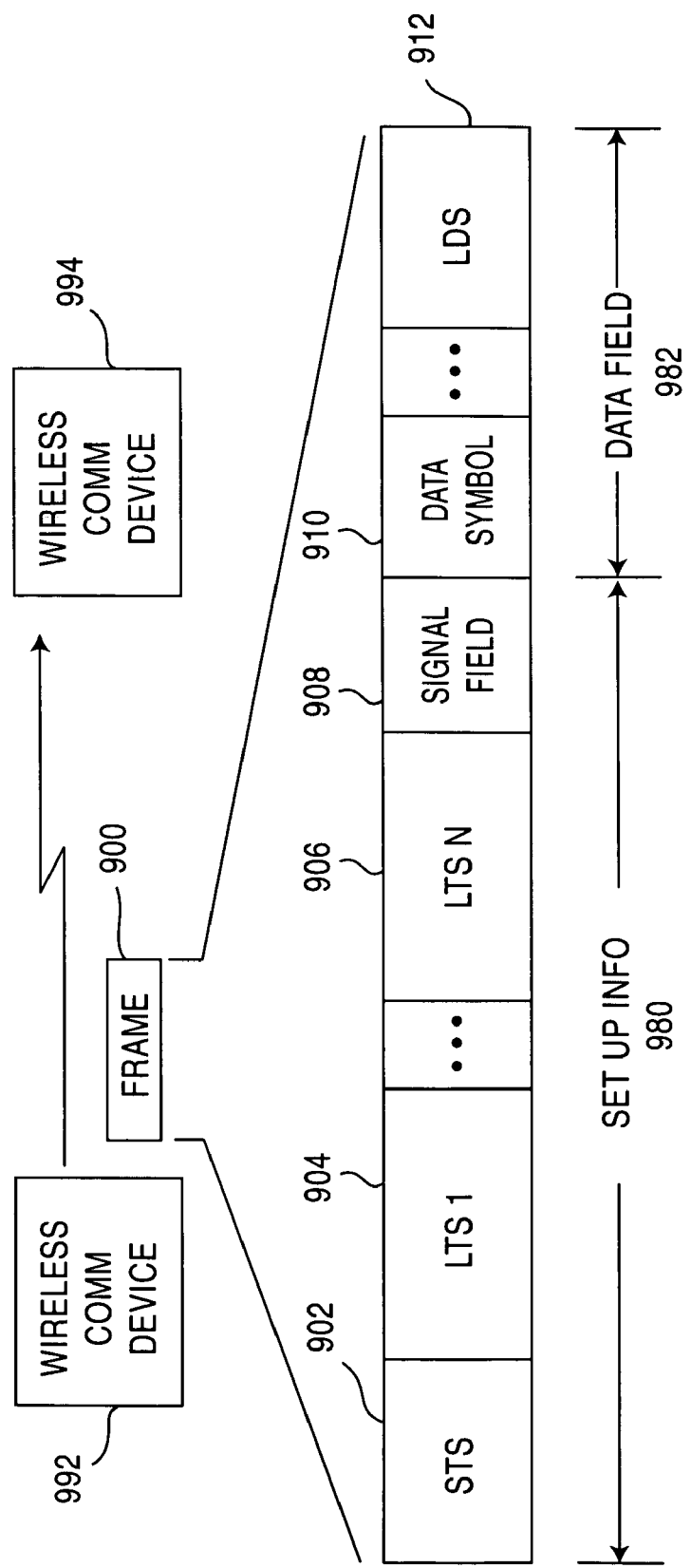
FIG. 7 illustrates a system for wireless communication in accordance with the present invention.

FIG. 7 depicts a system for wireless communication between two wireless communication devices according to the present invention. The wireless devices may be in a proximal region where the wireless protocol may be standard 11n. The wireless communication may be direct, such as from a wireless communication device to a wireless communication device, or indirect, such as from a wireless communication device to an access point to a wireless communication device. In the example, wireless communication device 992 may provide frame 900 to wireless communication device 994. Frame 900 includes a wireless communication set-up information field 980 and a data field 982. Wireless communication set-up information field 980 includes a short training sequence 902 that may be about 8 microseconds long, a 1$^{st}$ supplemental long training sequence 904 that may be about 4 microseconds long, which is one of a plurality of supplemental long training sequences 906, and a signal field 908 that may be about 4 microseconds long. The number of supplemental long training sequences 906 may correspond to the number of transmit antennas being utilized for multiple input multiple output (MIMO) radio communications. Supplemental long training sequences 906 may be expanded with relation to a frequency domain window, as previously described.

Data field 982 of frame 900 include a plurality of data symbols 910, each being about 4 microseconds in duration. A last data symbol 912 also includes tail bits and padding bits. Data field 982 may be combined with set up information 980 to create frame 900. Frame 900 may be transmitted to devices, such as device 994.

Figure 8:
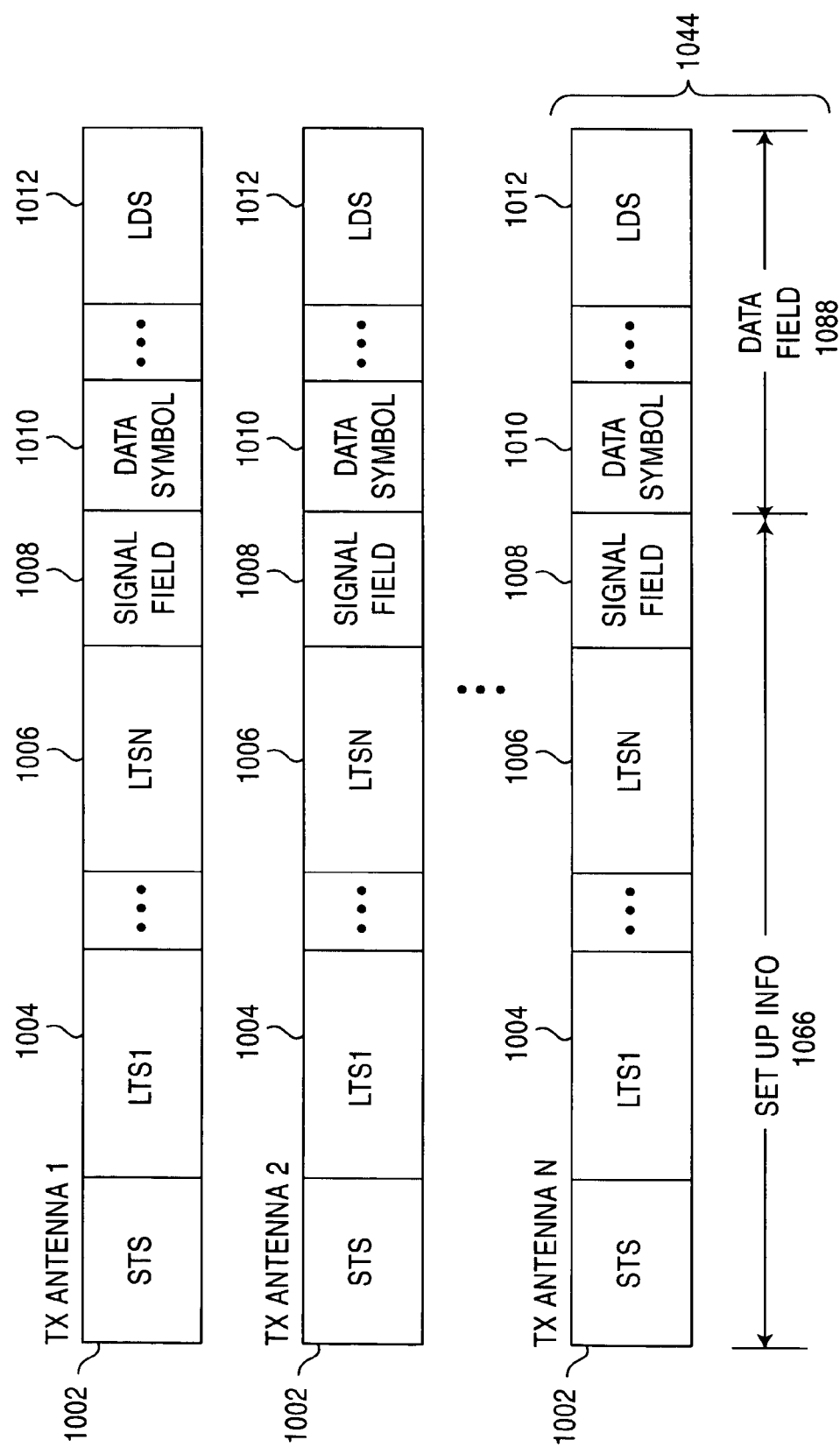
FIG. 8 illustrates frames for wireless communication in accordance with the present invention.

FIG. 8 depicts frames for wireless communication between two wireless communication devices according to the present invention. The wireless devices may be in a proximal region where the protocol may be standard 11n. The wireless communication may be direct, such as from wireless communication device to wireless communication device, or indirect, such as from a wireless communication device to an access point to a wireless communication device. In this example, a wireless communication device, such as wireless communication device 992 of FIG. 7, is providing frame 1044 to another wireless communication device, such as wireless communication device 994, using multiple antennas.

Frame 1044 includes a wireless communication set-up information field 1066 and a data field 1088. Wireless communication set-up information field 1066 may include a short training sequence 1002 that may be about 8 microseconds long, a 1$^{st}$ supplemental long training sequence 1004 that may be about 4 microseconds long, which is one of a plurality of supplemental long training sequences 1006, and a signal field 1008 that may be about 4 microseconds long. The number of supplemental long training sequences 1006 may correspond to the number of transmit antennas being utilized for MIMO radio communications within a wireless network. Supplemental long training sequences 1006 may be expanded with relation to a frequency domain window, as previously described.

Data portion 1088 of frame 1044 may include a plurality of data symbols 1010, each being about 4 microseconds in duration. Last data symbol 1012 also may include tail bits and padding bits. The preamble, which may be referred to as "Greenfield," may be generated and may apply when standard 11n devices are present. Alternatively, it may be used with legacy devices or components (.11,.11a,.11b, and .11g) when MAC level protection is employed. MAC level protection may also be used when legacy stations are not present to protect very long bursts.

Short training sequence 1002 may be the same as standard 11a devices or components for TX antenna 1. For antennas 2 to N, the same sequence may be cyclic shifted. For example, the amount of cyclic shift per antenna may be computed from (Antenna number−1)*800/N in nanoseconds. Thus, for 1 antenna, the shift may be zero. For 2 antennas, the shift may be 0 ns for antenna 1 and 400 ns for antenna 2. For 3 antennas, the shifts may be 0, 250, and 500 ns. For 4 antennas, the shifts may be 0, 200, 400, and 600 ns. The implementation is most straightforward when the shifts are rounded to units of 50 ns, or the inverse of the symbol clock frequency. Shifts may be implemented in either a forward or backward direction.

Several possible implementations of supplemental long training sequences 1006 may exist. For example, there may be one supplemental long training sequence 1004. For antenna 1, long training sequence 1004 may be the same as the standard 11a long training sequence but about 4 microseconds long, including a 0.8 microsecond guard interval. For antennas 2 to N, long training sequence 1004 may be a cyclic shifted version of the same sequence. For example, the amount of cyclic shift per antenna may be computed from (Antenna number−1)*4/N in microseconds. Thus, for 1 antenna, the shift may be zero. For 2 antennas, the shift may be 0 ns for antenna 1 and 4 ns for antenna 2. For 3 antennas, the shifts may be 0, 2.65 us, 5.35 us. For 4 antennas, the shifts may be 0, 2, 4, and 6 microseconds. The implementation is most straightforward when the shifts are rounded to units of 50 ns, or the inverse of the symbol clock frequency. Shifts may be implemented in either a forward or backward direction.

In another example, the number of supplemental long training sequences 1006 may be equal to the number of transmit antennas (N). This example may be in contrast to the previous example because it may lead to less channel estimation error at the receiver, especially for large numbers of antennas. Thus, it may be scalable. There may be the following choices of training sequences:

Zero space—sequences (1,1), (2,2), (3,3), . . . up to (N,N) are the same as the standard 11a long training sequence. All others (i.e. (1,2), (2,1), etc) are null—nothing is transmitted during that time slot or that field.

Subchannel null—the set of sub-channels in the training sequences may be sub-divided by the number of transmit antennas. Individual subsets are activated on each sub-training interval.

Orthogonal sequences may be generated by multiplying the subcarriers of the standard 11a long training sequence by an m×m orthonormal matrix, which generates a discrete Fourier transform.

Alternatively, set-up information 1066 may be a legacy portion which includes short training sequence signal field 1008. Signal field 1008 may include several bits to indicate the duration of frame 1044. Thus, the standard 11a compliant devices or components within the proximal area and the standard 11g compliant devices or components within the proximal area may recognize that frame 1044 may be transmitted even though such devices may not be able to interpret the remaining portion of the frame. In this instance, the legacy devices or components (standard 11a and standard 11g) may avoid a collision or interference with the standard 11n communication based on a proper interpretation of a legacy portion of set-up information 1066.

For example, m may be referred to as the number of longer training sequences per frame, N may be referred to as the number of transmit antennas, the preamble may be for the case when standard 11a or standard 11g legacy devices are present. In this example, "Brownfield" may refer to the preamble because it is applicable to legacy devices. The short training and long training sequences may be the same as standard 11a for TX antenna 1. For antennas 2 to N, there may be the following possibilities:

1) Use a cyclic shifted version of the same sequence. The amount of cyclic shift per antenna may be computed from (Antenna number−1)*800/N in nanoseconds for the short training and (Antenna number−1)* 4/N in microseconds.

2) Another mode may leave the short training through signal field parts transmitted on antennas 2 to N as null, so that these antennas do not transmit during this interval. Further, supplemental long training sequences 1210 from antenna 1 are not used and nothing is transmitted during this time.

Signal field 1008 may follow the same format as standard 11a, except the reserved bit (4) may be set to 1 to indicate a standard 11n frame and subsequent training for standard 11n receivers. Supplemental long training sequences 1006 may be defined in multiple ways:

(m=1) For example, there may be one long supplemental training sequence 1004. It may be orthogonal to the standard 11a long training sequence.

(m=N−1) For example, the number of training sequences 1006 may equal the number of transmit antennas (N). This example is may differ from the previous example because it may lead to less channel estimation error at the receiver, especially for large numbers of antennas. Thus, supplemental training long training sequences 1006 may be scalable.

The following choices of training sequence may also exist:

Zero space—sequences (1,1), (2,2), (3,3), . . . up to (m,m) may be the same as the standard 11a long training sequence. All others (i.e. (1,2), (2,1), etc) may be null so that nothing is transmitted during that time slot.

Subchannel null—the set of sub-channels in the training sequences may be sub-divided by the number of transmit antennas. Individual subsets may activate on each sub-training interval.

Orthogonal sequences may be generated by multiplying the standard 11a long training sequence by an m×m orthonormal matrix, such as the matrix that generates a discrete Fourier transform. For example, the 4 antenna example may employ the following orthonormal matrix to generate the subcarriers for each supplemental long training sequence 1210.

$$S_k = \begin{bmatrix} S_{10,k} & S_{11,k} & S_{12,k} \\ S_{20,k} & S_{21,k} & S_{22,k} \\ S_{30,k} & S_{31,k} & S_{32,k} \end{bmatrix} = \begin{bmatrix} S_{00,k} & S_{00,k} \cdot e^{i \cdot \theta_k} & S_{00,k} \cdot e^{i \cdot \phi_k} \\ S_{00,k} & S_{00,k} \cdot e^{i \cdot (\theta_k - \frac{4\pi}{3})} & S_{00,k} \cdot e^{i \cdot (\phi_k - \frac{2\pi}{3})} \\ S_{00,k} & S_{00,k} \cdot e^{i \cdot (\theta_k - \frac{2\pi}{3})} & S_{00,k} \cdot e^{i \cdot (\phi_k - \frac{4\pi}{3})} \end{bmatrix}$$

$$\theta_k = \pi \cdot k / (4 \cdot N_{subcarries})$$

$$\phi_k = \pi \cdot (k+4) / (2 \cdot N_{subcarries})$$

Figure 9:
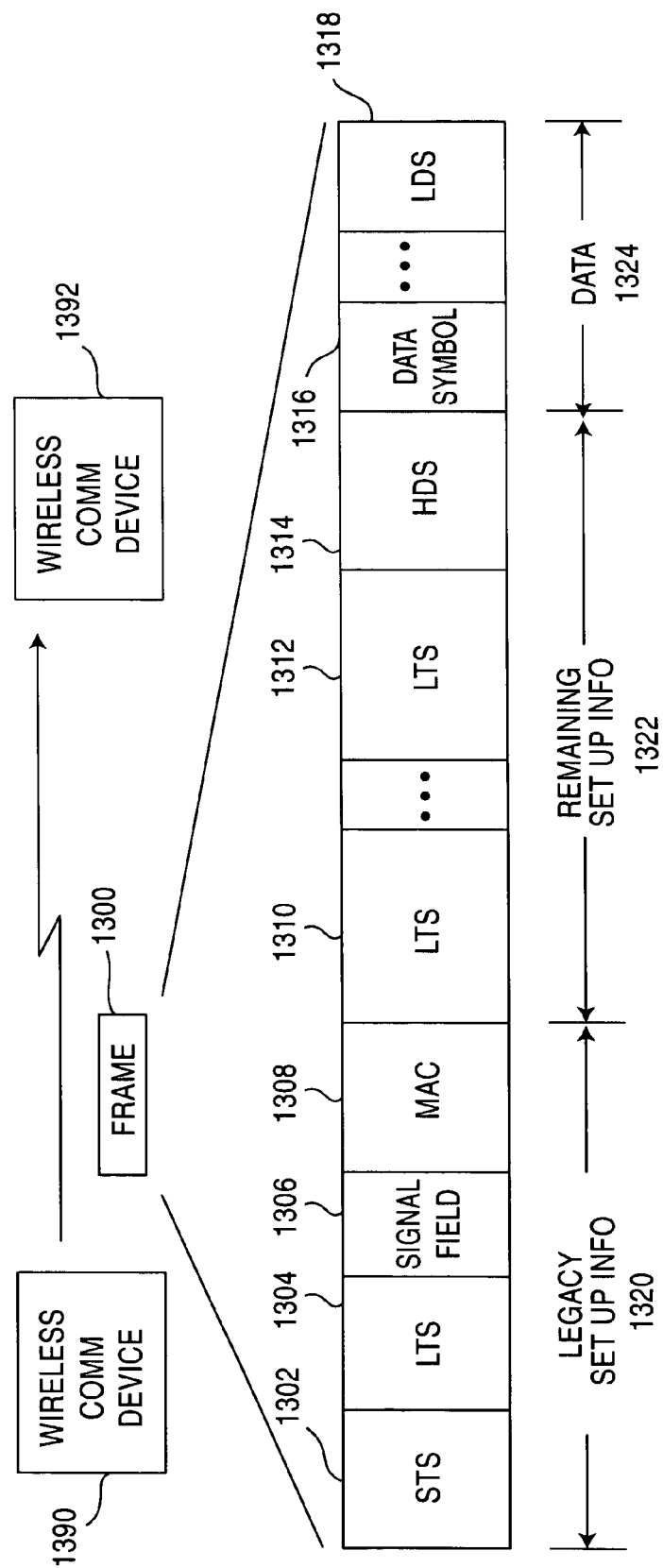
FIG. 9 illustrates another system for wireless communication in accordance with the present invention.

FIG. 9 depicts a wireless communication between two wireless communication devices according to the present invention. The wireless devices may be standard 11n compliant. The wireless communication may be direct or indirect within a proximal area that includes standard 11n compliant devices or components, standard 11a, standard 11b or standard 11g devices or components. Frame 1300 may include a legacy portion of set-up information 1320, remaining set-up information 1322 and data portion 1324. Legacy portion of set-up information 1320, or the legacy frame, includes an IEEE 802.11 PHY preamble, such as short training sequence 1302, long training sequence 1304, and signal field 1306, and a MAC partitioning frame portion 1308, which indicates the particulars of this particular frame that may be interpreted by legacy devices. Thus, the legacy protection may be provided at the MAC layer.

Remaining set-up information 1322 may include a plurality of supplemental long training sequences 1310 to 1312, and high data signal field 1314. Data portion 1324 may include a plurality of data symbols 1316 and a last data symbol 1318 that includes tail and padding bits. Supplemental long training sequences 1312 may be expanded in relation to the frequency domain window, as previously described.

Figure 10:
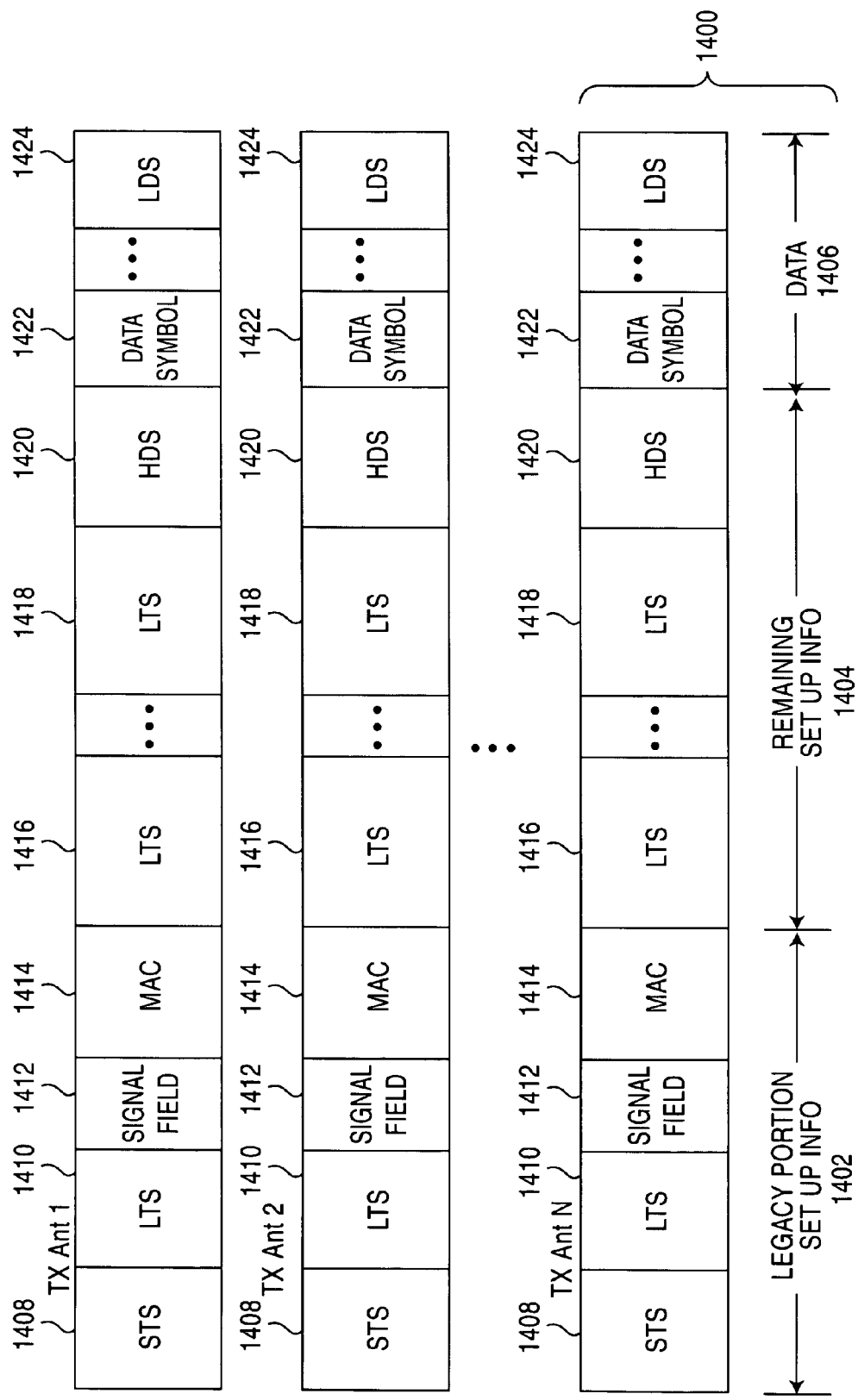
FIG. 10 illustrates another set of frames for wireless communication in accordance with the present invention.

FIG. 10 depicts frames for wireless communication between two wireless communication devices according to the present invention. The wireless devices may be standard 11n compliant using multiple antennas. The wireless communication may be direct or indirect within a proximal area that includes standard 11n compliant devices or components, and standard 11a, standard 11b or standard 11g devices or components. Frame 1400 may include a legacy portion of set-up information 1402, remaining set-up information 1404 and data portion 1406. Legacy portion of set-up information 1402, or legacy frame, may include an IEEE 802.11 PHY preamble, such as short training sequence 1408, long training sequence 1410, signal field 1412, and a MAC partitioning frame portion 1414, that indicates the particulars of this frame that may be interpreted by legacy devices. Thus, the legacy protection may be provided at the MAC layer. Signal field 1412 may use MAC partitioning to set the NAV of legacy stations. MAC partitioning frame portion 1414 may contain frame information, coded at a legacy rate to allow reception by standard 11a and standard 11g stations.

Remaining set-up information 1404 may include a plurality of supplemental long training sequences 1416 and 1418 and high data service field 1420. Data portion 1406 may include a plurality of data symbols 1422 and a last data symbol 1424 that includes tail and padding bits. One or more of supplemental long training sequences 1418 may be expanded in relation to the frequency domain window, as previously described.

The preceding discussion has presented various embodiments for preamble generation for wireless communications in a wireless communication system. As one of average skill in the art will appreciate, other embodiments may be derived from the teachings of the present invention without deviating from the scope of the claims.

The invention claimed is:

1. A method for transmitting a preamble for a frame of a wireless communication, the method comprising:
   generating a first training sequence for a preamble of a frame;
   inserting a frequency domain window into said first training sequence; and
   stimulating a set of subcarriers with said frequency domain window during long training.

2. The method of claim 1, further comprising generating a second training sequence for said preamble.

3. The method of claim 2, further comprising determining said second training sequence is different than said first training sequence, wherein said frequency domain window is inserted into said first training sequence of said preamble.

4. The method of claim 2, further comprising stimulating another set of subcarriers with said second training sequence, wherein said another set of subcarriers is smaller than said set of subcarriers.

5. The method of claim 1, further comprising generating a set up portion of said preamble including said first training sequence.

6. The method of claim 2, further comprising generating a set up portion of said preamble including said first training sequence and said second training sequence.

7. The method of claim 1, further comprising estimating a channel using said first training sequence and said set of subcarriers.

8. The method of claim 1, further comprising transmitting said preamble over a plurality of transmitters.

9. The method of claim 1, further comprising receiving said preamble over a plurality of receivers.

10. A method for generating a preamble of a frame for wireless communication, the method comprising:
   receiving a training sequence for a preamble;
   determining said training sequence comprises a first training sequence; and
   inserting a frequency domain window into said first training sequence.

11. The method of claim 10, further comprising stimulating subcarriers to estimate a channel for said wireless communication with said first training sequence.

12. The method of claim 10, further comprising determining said training sequence includes a second training sequence.

13. The method of claim 10, further comprising transmitting said first training sequence with said frequency domain window.

14. A method for stimulating subcarriers in an orthogonal frequency division multiplexing system, the method including inserting a frequency domain window into a first training sequence of a preamble, wherein said first training sequence stimulates said subcarriers.

15. The method of claim 14, further comprising stimulating a subset of said subcarriers with a second training sequence in said preamble.

16. A device for transmitting a frame in a wireless system, the device comprising:
   a signal generator to generate a preamble for a frame;
   a multiplexer to insert a frequency domain window into a first training sequence within said preamble;
   an IFFT module to convert said frame with said preamble to a time domain signal; and
   a plurality of antennas to transmit said frame.

17. The device of claim 16, further comprising subcarriers of said frame, wherein said first training sequence stimulate said subcarriers with said frequency domain signal.

18. The device of claim 17, further comprising a symbol mapper to map coded bits to said subcarriers.

19. The device of claim 16, wherein said preamble includes a second training sequence along with said first training sequence.

20. A system comprising:
   generating means for generating a training sequence for a preamble of a frame;
   inserting means for inserting a frequency domain window into said training sequence; and
   stimulating means for stimulating a set of subcarriers with said frequency domain window during long training.

21. A system comprising:
   receiving means for receiving a training sequence for a preamble;
   determining means for determining said training sequence includes a first training sequence; and
   inserting means for inserting a frequency domain window into said first training sequence.

22. The system of claim 21, further comprising another determining means for determining said training sequence includes a second training sequence.

23. The system of claim 21, further comprising stimulating means for stimulating subcarriers to estimate a channel for wireless communication with said first training sequence.

* * * * *